United States Patent

Conti

[11] 3,908,341
[45] Sept. 30, 1975

[54] CAP FEEDING DEVICE
[75] Inventor: Vincent N. Conti, West Hempstead, N.Y.
[73] Assignee: Dairy Cap Corporation, Jamaica, N.Y.
[22] Filed: Feb. 7, 1974
[21] Appl. No.: 440,312

[52] U.S. Cl. .................. 53/314; 53/315; 53/331.5
[51] Int. Cl.² ..................... B67B 3/20; B67B 3/08
[58] Field of Search ............ 53/313, 314, 315, 317, 53/331.5; 221/175, 178–181; 198/276, 288, DIG. 12

[56] References Cited
UNITED STATES PATENTS

| | | | |
|---|---|---|---|
| 1,391,648 | 9/1921 | Edgecombe, Jr. | 53/315 |
| 1,445,296 | 2/1923 | Clark | 53/313 UX |
| 2,829,479 | 4/1958 | Cooper | 53/331.5 |
| 2,855,736 | 10/1958 | Harmon et al. | 53/313 X |
| 3,012,388 | 12/1961 | Stover | 53/315 |
| 3,124,916 | 3/1964 | Anderson et al. | 53/314 X |
| 3,342,372 | 9/1967 | Whitchurch | 53/313 X |
| 3,460,312 | 8/1969 | Stover | 53/315 X |
| 3,578,140 | 5/1971 | Myer et al. | 198/288 |
| 3,771,284 | 11/1973 | Boeckmann et al. | 53/314 X |

Primary Examiner—Travis S. McGehee
Assistant Examiner—Horace M. Culver
Attorney, Agent, or Firm—Pennie & Edmonds

[57] ABSTRACT

A cap feeding device for feeding caps from a supply bin downwardly through a delivery chute and onto bottles and beginning the threading of the caps on the bottles is disclosed. The chute is specially designed in order to allow only properly oriented caps to enter it. The chute is also oversized in order to prevent the caps from jamming during their conveyance down the chute. The bottom of the chute includes holding and release structure which guides the caps onto the bottles as they are pulled from the chute by advancing bottles. The caps then pass between a pair of rails which support the cap and rotate it, thereby initiating the threading operation.

19 Claims, 10 Drawing Figures

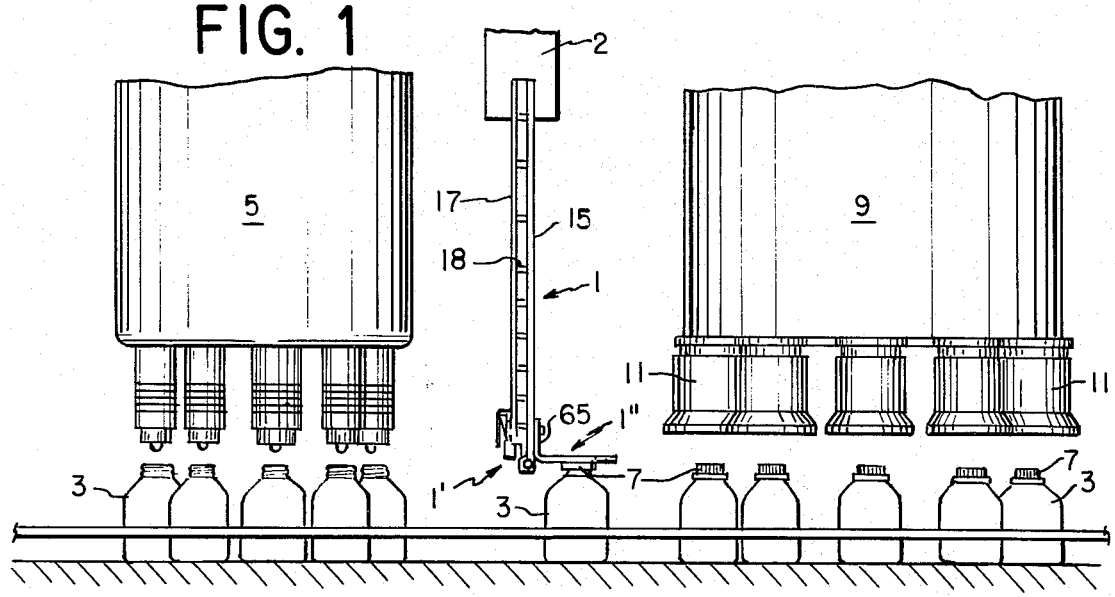
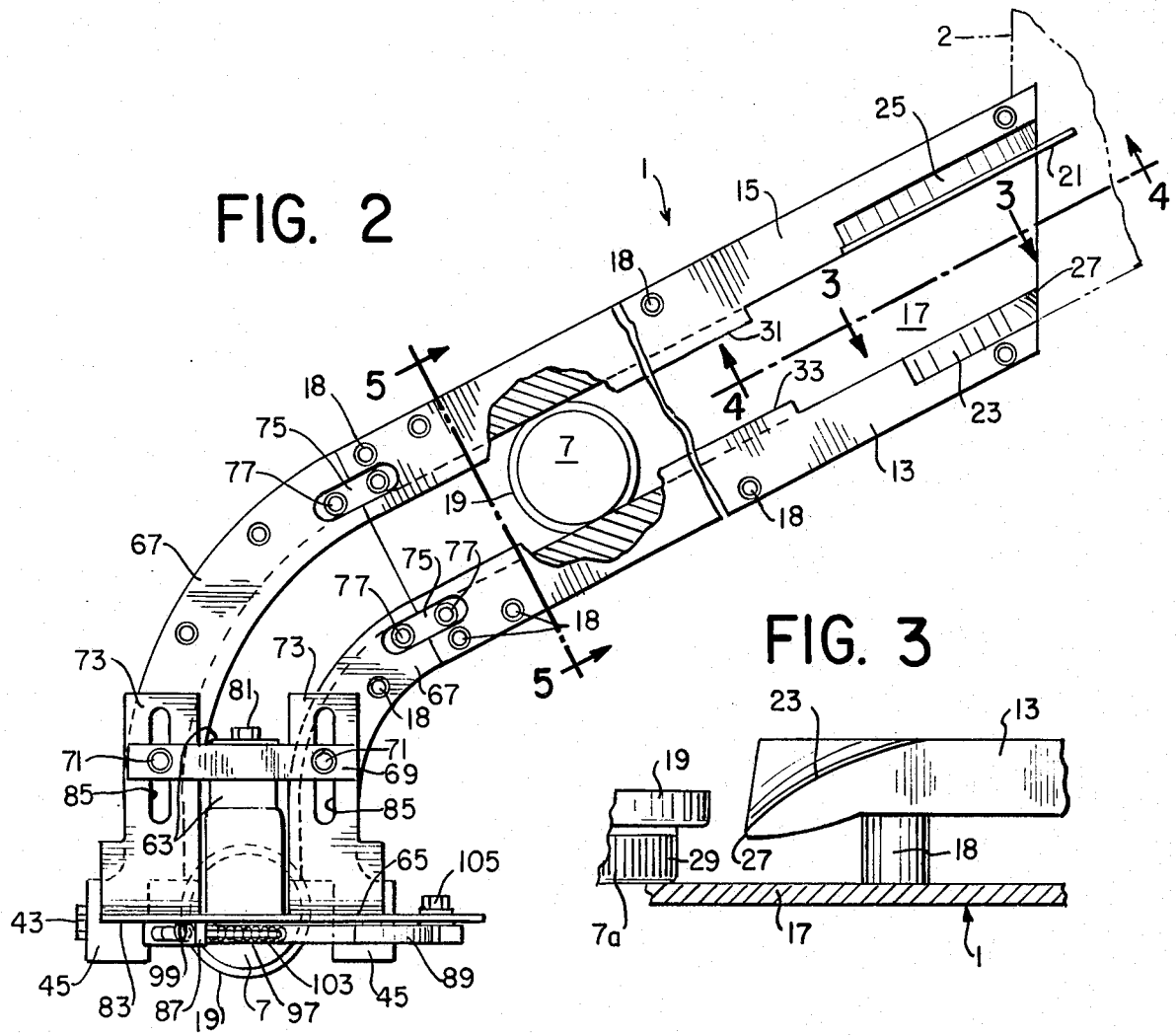
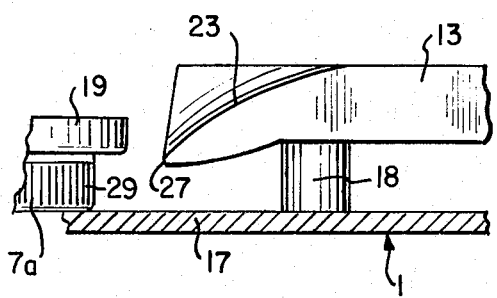

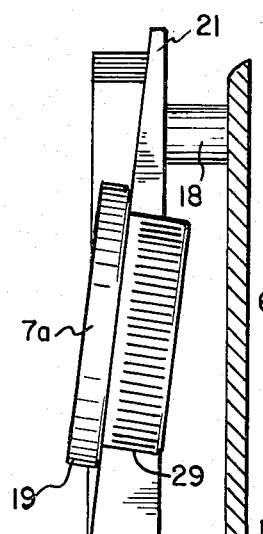
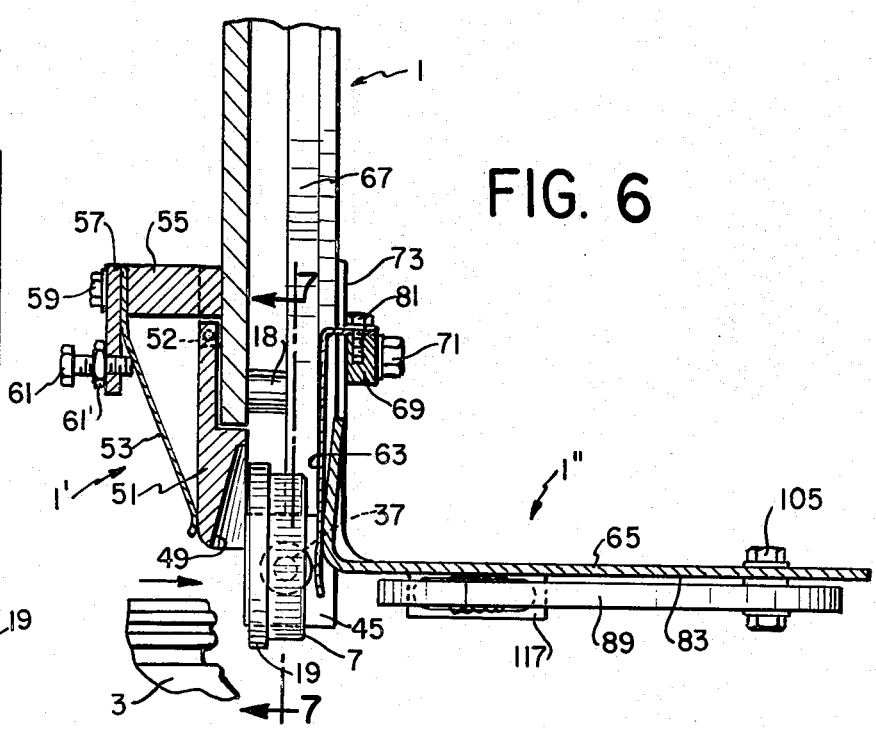
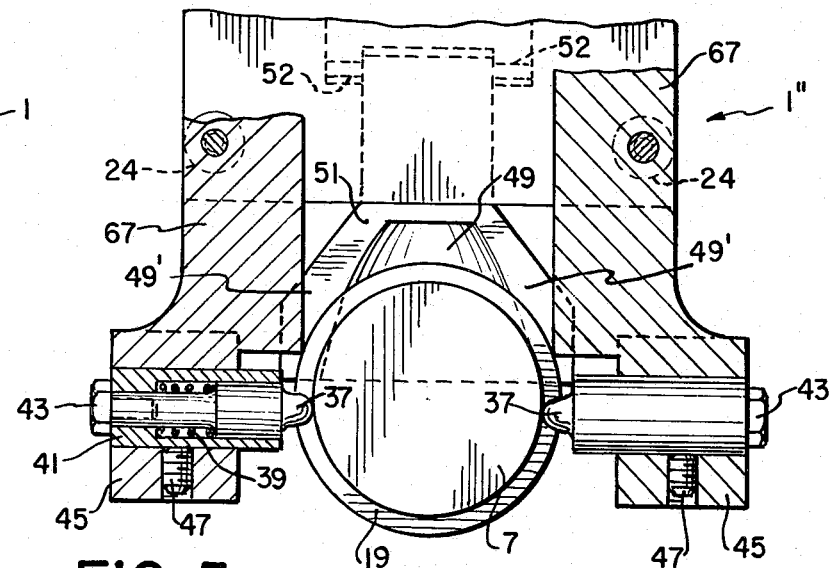
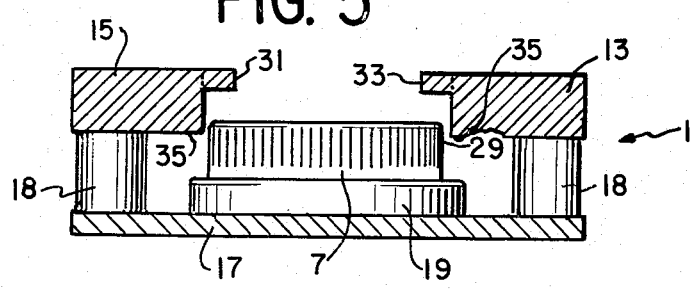

CAP FEEDING DEVICE

BACKGROUND OF THE INVENTION

In some conventional bottle capping machinery, a bin which is filled with bottle caps is used to supply bottle caps through a chute to a capping mechanism. Caps travel down the chute and pass through a spring device which allows removal of single caps from the chute. A system of this type is shown in U.S. Pat. No. 2,072,245. As the filled bottle approaches the output of the chute, the top of the bottle engages the cap, pulling it free and allowing it to rest on the bottle.

In existing machines, after a cap has been placed on top of the bottle, it is often put through a pre-tightener which employs a single serrated member bearing against the serrated rim of the cap as it moves forward, thereby rotating it. This prevents the cap from falling off before the tightener tightens it.

There are a number of inadequacies in the existing bottle cappers. Difficulties are encountered in insuring that all the caps are fed down the chute with the proper orientation. Once the caps are in the chute, additional problems occur due to jamming of caps in the chute. This results in stoppage of the flow of caps down the chute. When this happens, the cost of remedying the problem is high, due to the time-consuming nature of the task.

The caps may also become jammed at the output end of the chute. The jammed caps tend to act as an obstruction which knocks over bottles which are passing under the chute output end. Even large bottles may be knocked over by a protruding cap or caps.

The use of pre-tighteners have also proven very poor for the task of pre-tightening. This is due, in part, to the excessive friction created between the inner circumference of the cap and the outer circumference of the bottle. Indeed, the elimination of such a pre-tightening operation can even provide a better overall capping machine design.

SUMMARY OF THE INVENTION

In accordance with the present invention, apparatus is provided for transferring caps down a chute, placing them on bottles and performing a pre-tightening operation in a manner far superior to the prior art. The apparatus is particularly suited for use with caps having a serrated outer circumference, although it may be used with any cap that can be frictionally engaged. The present invention eliminates the problems of the prior art involving the improper orientation of the caps and the jamming of caps in the chute. Additional features of the machine include structure for preventing the multiple jamming of caps at the output end of the chute and for pre-screwing the caps before they leave the capping station.

As the caps approach the chute, those caps which have an improper orientation are guided out of the chute by a rim on the outer circumference of the cap which engages a tapered rail structure at the chute entrance. Jamming in the chute is minimized by the use of a chute which is oversized. This is in contrast to prior art systems which had chutes very closely matched to the size of the caps. An oversized chute is selected due to the fact that most jamming tends to occur when caps fall over each other, with the rim of one cap supporting the bottom of another. An oversized chute allows even caps that have fallen over each other to pass freely.

In contrast with prior art systems, which included a spring-biased member for releasing the cap, the present invention uses a pivotally mounted and specially shaped spring-biased guide which, when the machine is functioning properly, is only very slightly moved. The guide has a guide surface that is shaped to accommodate and guide the movement of the cap. A pair of spring-biased studs are provided at the output of the chute to prevent the caps from falling out of the chute until the bottle to be capped comes into contact with the cap. If a plurality of caps are jammed at the output, the bottle will pivot the guide further open and clear the machine of the jammed caps. The prior art problem of the caps being stuck at the output of the chute is thus overcome. In conventional machines, instead of falling harmlessly from the chute, the jammed caps remain there as an obstacle, knocking over bottles as they pass under the capping station.

Pre-tightening is accomplished through the use of a pair of diagonally pivoted and spring-biased rails, one of which is provided with a gripping or driving surface and the other of which is smooth. Both elements are spring-biased toward the cap to be pre-tightened. The gripping surface acts to engage the circumference of the cap, turning it as it passes between the two elements. The smooth surface acts as a source of equalizing force on the bottle cap during the pre-tightening operation.

BRIEF DESCRIPTION OF THE DRAWINGS

FIG. 1 is an illustration of a bottle filling, capping, and tightening system including a cap feeding device constructed in accordance with the present invention;

FIG. 2 is a plan view, partially in section, of the cap delivery chute of the cap feeding device illustrated in FIG. 1;

FIG. 3 is a sectional view of the chute along line 3—3 of FIG. 2;

FIG. 4 is a sectional view of the chute along line 4—4 of FIG. 2;

FIG. 5 is a sectional view along line 5—5 of FIG. 2;

FIG. 6 is a sectional view of the holding and release means at the output end of the chute illustrated in FIG. 2;

FIG. 7 is a sectional view along line 7—7 of FIG. 6;

DETAILED DESCRIPTION OF THE PREFERRED EMBODIMENTS

Figure 8:
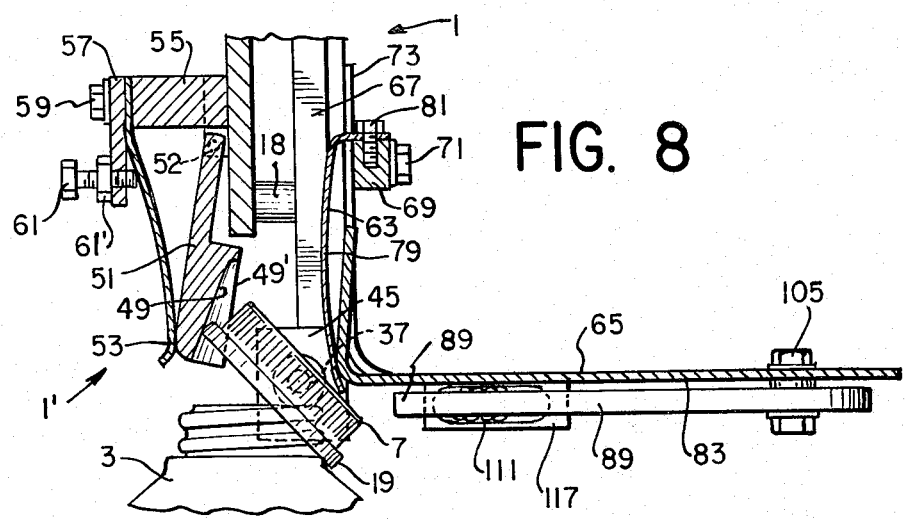
FIG. 8 is a sectional view of the structure illustrated in FIG. 6 during the capping operation.

FIG. 1 illustrates a typical bottling system including a cap feeding device built in accordance with the present invention. Caps are fed into the chute 1 from a supply bin 2, which is vibrated to facilitate the feeding operation. Bottles 3, which have been filled by a conventional filling unit 5, are moved past the lower output end of the chute 1. The chute performs the function of conveying caps 7 from the supply in the bin 2 and aligning them for placement on the bottles 3 as the latter pass under the chute. A holding and release means 1', disposed at the output end of the chute, functions to place the caps on the associated bottles and guide them properly to a pretightening mechanism 1″ which initiates the threading of the caps onto the bottles. The capped bottles are then fed to a final tightening station 9, which includes a plurality of cap tighteners 11. The path of movement of the bottles through the bottling system is curved as will be evident from the drawings and following description.

Referring to FIGS. 2-5, the cap delivery chute 1 comprises elongated guide rails 13 and 15 and an elongated guide plate 17, which are secured to each other by posts 18. Caps 7, which are circular and generally hat-shaped, are provided with a lower, elongated rim 19 which, if the cap is properly oriented, will pass under a finger 21 as the cap enters the chute. If a cap, such as cap 7a, is improperly oriented as it approaches the chute, it will not be allowed to enter the chute. Inclined plane surfaces 23 and 25 of guide rails 13 and 15 guide improperly oriented caps away from the chute. The outermost point 27 of inclined plane surface 23 is positioned at a point whose distance from guide plate 17 is less than the height of the serrated upper portion 29 of the caps 7. This arrangement insures the positive engagement of an improperly oriented cap 7a and its subsequent transfer away from the chute as illustrated in FIGS. 3 and 4. Although the system has been described in connection with rimmed caps, any cap with a geometry including a top and bottom of different size would work just as well.

Jamming most commonly occurs when the rim of one cap, such as cap 7b, rides up upon the rim of another cap. In prior chutes, this resulted in stoppage of the flow of caps down the chute due to the fact that the dimensions of the chute were very close to the dimensions of the caps. As illustrated in FIG. 5, the guide rails 13 and 15 are provided with extensions 31 and 33 overlying the guide plate 17 laterally and inwardly of the guide rails. In order to prevent caps from becoming jammed upon one another, the distance between guide plate 17, which engages the bottom of the caps, and guide rails 13 and 15 and their extensions 31 and 33, which overlie the guide plate and caps, are maintained within specific ranges. In particular, the distance between bottom surfaces 35 of guide rails 13 and 15 and the guide plate 17 is slightly greater than twice the height of the rim 19 of a cap 7. The distance between guide plate 17 and extensions 31 and 33 is slightly greater than the height of a cap plus the height of the rim of a cap. As seen in FIG. 5, the guide rails are spaced laterally from each other by a distance less than the diameter of the rim of the caps and greater than the diameter of the upper portion of the caps so that they will overlie the rims of the caps. Also, the lateral spacing of the extensions is less than the diameter of the upper portion of the caps. The above described construction of the cap delivery chute allows the caps to ride over each other, as illustrated in FIG. 4, and still easily slide down the chute.

As illustrated in FIGS. 6 and 7, the leading cap 7 in the chute is held in place awaiting the approach of the bottle 3 by holding and release means 1′ constructed in accordance with the teachings of the present invention. This means includes two studs 37 that prevent the leading cap from falling from the chute. The studs are spaced laterally from each other by a distance slightly less than the diameter of the upper portion of the caps for engagement therewith to hold this cap in the chute with the leading portion of the cap exposed for engagement and removal from the chute by a bottle 3 passing the output end of the chute. Each of the studs is biased toward the leading cap by a spring 39 held in a housing 41. Forward movement of each stud is limited by the head of a bolt 43, which screws into the tapped hole in each of the studs 37. Each housing 41 is supported by a support block 45 and is held in place by a set-screw 47.

During the transfer of cap 7 to bottle 3, the cap is guided by a curved or dished guide surface 49 of a guide 51. The dish-shaped surface of the guide 51 is progressively deeper and larger as measured in the direction of movement of the caps through the chute for engaging the trailing bottom edge surface as it is pivoted during removal from the chute. The guide 51 also has flat surfaces 49′ on the laterally opposite sides of the dish-shaped surface. These surfaces 49′ maintain the leading cap in a generally vertical orientation prior to engagement by a bottle 3.

Guide 51 is pivotally mounted on supports 52 and is biased toward the cap by a leaf spring 53. The leaf spring 53 is mounted on a support 55. Also mounted on support 55 is a plate 57, which together with leaf spring 53 is secured to support 55 by a screw 59, which screws into support 55. Plate 57 supports a bolt 61, which is turned to vary the force with which leaf spring 53 urges guide 51 toward cap 7. The position of bolt 61 is locked by a nut 61′.

Cooperating with the guide 51 is a flexible deflector member 63. Deflector 63 is constructed of spring metal and is positioned in opposed relation to the guide 51 for engaging the top of the cap as the cap is pivoted along the guide surface 49 due to engagement of the cap by a bottle. The lower end of the deflector is free and extends beyond the guide 51 to define a pivot about which the caps pivot upon removal from the chute. As a cap is pulled from the chute by a bottle, studs 37 momentarily retract against the bias of the springs 39 and guide 51 pivots slightly due to the pivoting of the cap and sliding of the rim along the curved surface 49. Also, the deflector 63 flexes to permit smooth turning of the cap from the vertical to a horizontal orientation on the associated bottle. In the event that a number of caps are jammed at the output of the chute, the guide 51 has the ability to pivot to a greater extent, allowing the bottle to push the accumulation of caps from the output end of the chute, thereby clearing it.

Figure 10:
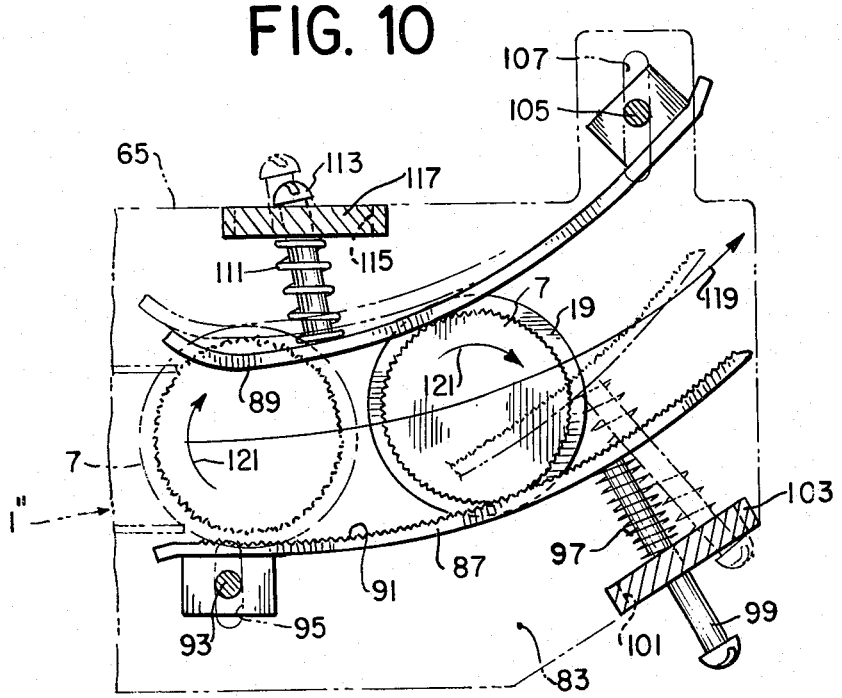
FIG. 10 is a plan view along line 10—10 of FIG. 9 showing the pre-tightening mechanism of the present invention.

The cap pre-tightening mechanism of the present invention is illustrated in FIG. 10. It is mounted on a curved plate 65 which is secured to curved extensions 67 of guide rails 13 and 15 by a support bar 69 and screws 71. Screws 71 pass through extensions 73 of curved plate 65 and screw into guide rail extensions 67. The guide rail extensions 67 are secured to the guide rails 13 and 15 by plates 75 and screws 77. The bar 69 also functions to support the deflector 63 which is secured thereto by a screw 81. See FIG. 8.

The position of the bottom surface 83 of curved plate 65 relative to the bottom end of the deflector is adjustable. This is accomplished through the provision of a pair of elongated holes 85 in extensions 73. This adjustment is made for optimum operation of the pre-tightener. For this purpose, the end of deflector 79 extends just below the bottom surface 83 of curved plate 65. The vertical position of the plate 65 is such as to prevent caps from moving upwardly off the associated bottles as they might tend to do if they start to be improperly threaded into the bottles. The plate 65 thus holds the caps in a horizontal orientation when necessary to prevent improper threading.

Figure 9:
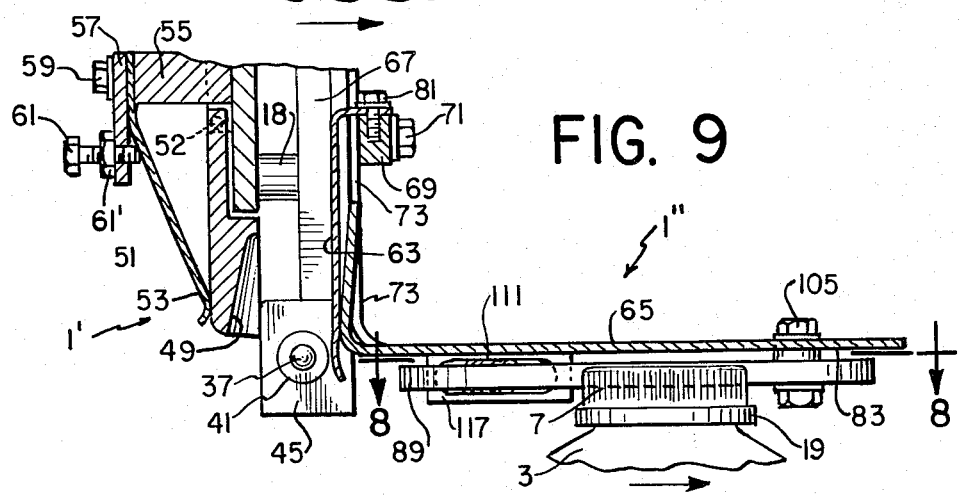
FIG. 9 is a sectional view of the structure illustrated in FIG. 6 during the pre-tightening operation.

As shown in FIGS. 9–10, the pre-tightening mechanism includes a pair of opposed, elongated rails for engaging the caps on diametrically opposite sides. One of the rails is a tightening rail 87 and the other, a counter-force rail 89. Both rails are attached to the bottom surface of the plate 65 and are located slightly below the lower end of the deflector 63. As seen from FIGS. 1 and 10, the rails extend along the curved path of movement of the bottles away from the chute.

Tightening rail 87 is provided with serrations 91 to provide a driving surface. As shown in FIG. 10, the serrations are complementary to the serrated portion 29 of the caps. The tightening rail is pivotally mounted at its upstream end on a support bolt 93, whose position may be varied to accommodate caps of different sizes by adjustment of bolt 93 in an elongated hole 95 in curved plate 65. The other, downstream end of tightening rail 87, is biased toward the cap 7 and rail 89 by spring 97. Spring 97 is mounted on a support bolt 99 which is welded to the tightening rail 87 and extends through an elongated slot 101 in plate 103. Plate 103 is secured to curved plate 65.

Counter-force rail 89 is pivotally mounted at its downstream end on a bolt 105, which is adjustably mounted in an elongated hole 107 in plate 65. The other, upstream end of counter-force rail 89, is urged toward cap 7 by a spring 111, supported by a bolt 113. Bolt 113 is welded to rail 89 and extends through an elongated slot 115 in a plate 117. Plate 117 is, in turn, secured to the curved plate 65. Counter-force rail 89 is smooth surfaced to permit sliding of the caps therealong, and they are drivingly engaged by the cooperating tightening rail 87. As the bottle 3 with its cap 7 advances through the pre-tightening mechanism, cap 7 engages tightening rail 87 and counter-force rail 89. This engagement first pivots rail 89, against the bias of spring 111, from the position indicated in solid lines. As the cap 7 is advanced through the tightener along the path indicated by arrow 119, it mechanically engages serrations 91 of tightening rail 87 and slides along the rail 89. As the movement of the cap progresses, the tightening rail 87 begins to pivot against the bias of spring 97 while the counterforce rail 87 is urged by spring 111 back toward its original solid line position. The pivoting coaction of the rails exerts a balanced force against the cap while still permitting tight engagement between the rails as the cap moves from one end thereof to the other. This results in controlled rotary motion of the cap as indicated by arrows 121 in FIG. 10. This rotation is sufficient to begin the threading operation, and balanced holding of the cap by the pivoting rails insures that the individual caps will not be cross-threaded onto the underlying bottle.

I claim:

1. A cap feeding device for successively delivering caps from a supply, downwardly through a delivery chute and onto bottles passing the output end of the chute, each of said caps having a circular hat shape defined by a lower enlarged rim and an upper portion, said chute comprising:
    a. an elongated guide plate for engaging the bottom of the caps, said guide plate extending from the cap supply to the output end of the chute;
    b. a pair of guide rails overlying the guide plate and spaced therefrom by a distance slightly greater than twice the height of the rim of the caps and spaced laterally from each other by a distance less than the diameter of the rim of the caps and greater than the diameter of the upper portion of the caps; and
    c. a cap pre-tightening mechanism for initiating the threading of the caps onto successive bottles passing away from the output end of the chute, said pre-tightening mechanism being horizontally disposed and positioned on the downstream side of the output end of the chute and including a first rail member for drivingly engaging one side of the caps and a smooth rail member surfaced for slidably engaging the diametrically opposite sides of the caps, said rail members extending along the path of movement of the bottles away from the chute for engaging opposite sides of the caps and rotating them onto the associated bottle as the bottles move away from the output end of the chute, wherein:
        i. one of said rail members is pivotally mounted, along the path of movement of the bottles at its upstream end;
        ii. the other of said rail members is pivotally mounted, along the path of movement of the bottles at its downstream end; and
        iii. spring means is provided for urging the other ends of the rail members toward the path of movement of the caps on the bottles.

2. A cap feeding device according to claim 1, wherein:
    a. said guide rails include extension means overlying the guide plate and spaced therefrom by a distance greater than the height of the caps plus the height of the rim of the caps and being positioned to overlie the upper portion of caps being fed through the chute.

3. A cap feeding device according to claim 2, wherein:
    a. said extension means comprises a pair of extensions, each of which is fixed to one of said guide rails and spaced laterally from each other by a distance less than the diameter of the upper portion of the caps.

4. A cap feeding device according to claim 3, further comprising:
    a. cap holding and release means at the output end of the chute for holding the leading cap in a vertical orientation with the leading portion thereof exposed for engagement and removal by a bottle passing the output end.

5. A cap feeding device according to claim 1, wherein:
    a. the first rail member is pivotally mounted at its upstream end.

6. A cap feeding device according to claim 5, wherein said cap pre-tightening mechanism includes:
    a. a horizontally disposed, elongated plate extending over and in the direction of the path of movement of the bottles away from said chute for preventing upward movement of the caps off the associated bottles; and
    b. said rail members are attached to the bottom surface of the elongated plate.

7. A cap feeding device according to claim 6, wherein:

a. said elongated plate is disposed slightly above the lower end of the deflector; and b. said rail members are horizontally disposed slightly below the lower end of the deflector.

8. A cap feeding device for successively delivering caps from a supply, downwardly through a delivery chute and onto bottles passing the output end of the chute, each of said caps having a circular hat shape defined by a lower enlarged rim and an upper portion, said chute comprising:

a. an elongated guide plate for engaging the bottom of the caps, said guide plate extending from the cap supply to the output end of the chute;

b. a pair of guide rails overlying the guide plate and spaced therefrom by a distance slightly greater than twice the height of the rim of the caps and spaced laterally from each other by a distance less than the diameter of the rim of the caps and greater than the diameter of the upper portion of the caps, said guide rails including extension means overlying the guide plate and spaced therefrom by a distance greater than the height of the caps plus the height of the rim of the caps and being positioned to overlie the upper portion of caps being fed through the chute, said extension means comprising a pair of extensions, each of which is fixed to one of said guide rails and spaced laterally from each other by a distance less than the diameter of the upper portion of the caps; and c. cap holding and release means at the output end of the chute for holding the leading cap in a vertical orientation with the leading portion thereof exposed for engagement and removal by a bottle passing the output end, said holding and release means comprising:

i. guide means pivotally mounted at the output end of the chute and forming a continuation of said guide plate, said guide means having a curved, dish-shaped surface for engaging the trailing bottom edge surface of the cap, said dish-shaped surface being progressively deeper and larger as of the caps through the chute; and ii. spring means for urging said guide means into engagement with the leading cap as it is removed from the chute.

9. A cap feeding device according to claim 8, wherein:

a. the guide means is provided with flat surfaces on the laterally opposite sides of the dish-shaped surface for engaging the aligned bottom edge surfaces of the leading cap.

10. A cap feeding device according to claim 8, wherein said holding and release means further comprises:

a. a deflector positioned at the output end of the chute in opposed relation to said guide means for engaging the top surface of the leading cap, said deflector having a free end extending beyond the guide means and defining a pivot point about which the leading cap pivots from its vertical orientation into a horizontal orientation as it is removed from the chute by engagement with a bottle.

11. A cap feeding device according to claim 10, wherein said holding and release means further comprises:

a. a pair of pins engaging generally diametrically opposite sides of the upper portion of the leading cap, said pins being spaced laterally from each other by a distance slightly less than the diameter of the upper portion of the cap; and b. spring means for urging the pins toward each other.

12. In a cap feeding device for successively delivering caps from a supply, downwardly through a delivery chute and onto bottles passing the output end of the chute, an improved holding and release means disposed at the output end for holding the leading cap in a vertical orientation with the leading portion thereof exposed for engagement and removal by a bottle passing the output end, said holding and release means comprising:

a. guide means pivotally mounted at the output end of the chute and forming a continuation thereof, said guide means having a curved, dish-shaped surface for engaging the trailing edge surface of the leading cap in the chute, the dish-shaped surface being progressively deeper and larger as measured in the direction of the path of movement of the caps through the chute; and b. spring means for urging said guide means into engagement with the leading cap as it is removed from the chute.

13. An improved holding and release means according to claim 12, wherein:

a. the guide means is provided with flat surfaces on the laterally opposite side of the dish-shaped surface for engaging the aligned bottom edge surface of the leading cap.

14. An improved holding and release means according to claim 13, further comprising:

a. a deflector positioned at the output end of the chute in opposed relation to said guide means for engaging the top surface of the leading cap, said deflector having a free end extending beyond the guide means and defining a pivot point about which the leading cap pivots from its vertical orientation into a horizontal orientation as it is removed from the chute by engagement with a bottle.

15. An improved holding and release mechanism according to claim 14, further comprising:

a. a pair of pins engaging generally diametrically opposite sides of the leading cap, said pins being spaced laterally from each other by a distance slightly less than the diameter of the cap; and b. spring means for urging the pins toward each other.

16. A cap pre-tightening mechanism for initiating the threading of caps onto successive bottles passing through a predetermined path, comprising:

a. a first serrated elongated rail member for drivingly engaging one side of a cap and a second smooth elongated rail member for slidably engaging the diametrically opposite side of the cap, said members extending along the path of movement of the bottles for engaging opposite sides of the cap and rotating them onto the bottles, wherein:

i. one of said rail members is pivotally mounted along the path of movement of the bottles at its upstream end;

ii. the other of said rail members is pivotally mounted along the path of movement of the bottles at its downstream end; and iii. spring means is provided for urging the other ends of the rail members toward the path of movement of the caps on the bottles.

17. A cap pre-tightening mechanism as in claim 16, wherein said spring means comprises:
   a. a bolt secured substantially proximate to the end of the rail;
   b. plate means disposed adjacent said rail, said bolt extending through an orifice in said plate means; and
   c. a spring disposed around said bolt and adapted to be compressed between said rail and said plate means.

18. A cap pre-tightening mechanism according to claim 16, wherein:
   a. the first rail member is pivotally mounted at its upstream end.

19. A cap pre-tightening mechanism according to claim 18, further comprising:
   a. a horizontally disposed, elongated plate extending over and in the direction of the path of movement of the bottles for preventing upward movement of the caps off the associated bottles; and
   b. means for attaching said rail members to the bottom surface of the elongated plate.

* * * * *